(12) United States Patent
Murase

(10) Patent No.: US 10,970,825 B2
(45) Date of Patent: *Apr. 6, 2021

(54) IMAGE PROCESSING METHOD AND IMAGE PROCESSING APPARATUS FOR EXECUTING IMAGE PROCESSING METHOD

(71) Applicant: IIX INC., Tokyo (JP)

(72) Inventor: Hiroshi Murase, Tokyo (JP)

(73) Assignee: IIX INC., Tokyo (JP)

(*) Notice: Subject to any disclaimer, the term of this patent is extended or adjusted under 35 U.S.C. 154(b) by 14 days.

This patent is subject to a terminal disclaimer.

(21) Appl. No.: 16/484,265

(22) PCT Filed: Feb. 9, 2017

(86) PCT No.: PCT/JP2017/004717
§ 371 (c)(1),
(2) Date: Aug. 7, 2019

(87) PCT Pub. No.: WO2018/146765
PCT Pub. Date: Aug. 16, 2018

(65) Prior Publication Data
US 2020/0005437 A1    Jan. 2, 2020

(51) Int. Cl.
*G06T 5/00* (2006.01)
*G06T 5/30* (2006.01)
*G06T 5/50* (2006.01)

(52) U.S. Cl.
CPC .............. *G06T 5/003* (2013.01); *G06T 5/006* (2013.01); *G06T 5/009* (2013.01); *G06T 5/30* (2013.01);
(Continued)

(58) Field of Classification Search
CPC .............. H04N 5/2173; H04N 5/23229; H04N 5/23212; H04N 1/40; H04N 5/21;
(Continued)

(56) References Cited

U.S. PATENT DOCUMENTS 5,764,209 A    6/1998  Hawthorne et al.
10,015,373 B2 * 7/2018  Murase ............... H04N 5/66
(Continued)

FOREIGN PATENT DOCUMENTS

JP    H04220882 A    8/1982
JP    S6010925 A    1/1985
(Continued)

OTHER PUBLICATIONS

ISA Japan Patent Office, International Search Report Issued in PCT Application No. PCT/JP2017/004717, dated Apr. 25, 2017, WIPO, 4 pages.
(Continued)

*Primary Examiner* — Twyler L Haskins
*Assistant Examiner* — Angel L Garces-Rivera
(74) *Attorney, Agent, or Firm* — Alleman Hall Creasman & Tuttle LLP

(57) ABSTRACT

An image processing method includes capturing a display image of a display panel in-focus with a camera; generating a first image by applying a high-pass filter to the captured image to remove or reduce a spatial frequency component corresponding to moiré that has appeared in the captured image; capturing the display image out-of-focus with the camera; generating a second image by applying a correction filter to the captured image to correct attenuation of the spatial frequency component of the captured image with the correction filter, and applying a low-pass filter to the corrected captured image; and generating a third image in which the moiré has been removed or reduced by compositing the first image and the second image. The sum of the transmittance of the high-pass filter and the transmittance of the low-pass filter is a constant value at any spatial frequency.

6 Claims, 16 Drawing Sheets

(52) U.S. Cl.
CPC ...... *G06T 5/50* (2013.01); *G06T 2207/20024* (2013.01)

(58) Field of Classification Search
CPC .......... H04N 5/232; H04N 5/66; H04N 17/04; G09G 3/3208; G09G 2320/029; G09G 2320/0233; G09G 2340/0464; G09G 5/00; G06T 5/003; G06T 5/006; G06T 5/009; G06T 5/30; G06T 5/50; G06T 2207/20024; G06T 2207/20004
See application file for complete search history.

(56) References Cited

U.S. PATENT DOCUMENTS

| | | |
|---|---|---|
| 2002/0039142 A1 | 4/2002 | Zhang |
| 2015/0271409 A1 | 9/2015 | Imoto et al. |
| 2015/0377798 A1 | 12/2015 | Zhu et al. |

FOREIGN PATENT DOCUMENTS

| | | |
|---|---|---|
| JP | H0257674 U | 4/1990 |
| JP | H08327496 A | 12/1996 |
| JP | 2000338000 A | 12/2000 |
| JP | 200277645 A | 3/2002 |
| JP | 2008011334 A | 1/2008 |
| JP | 2010057149 A | 3/2010 |
| JP | 2010203889 A | 9/2010 |
| WO | 2010123063 A1 | 10/2010 |
| WO | 2014050222 A1 | 4/2014 |
| WO | 2016009493 A1 | 1/2016 |

OTHER PUBLICATIONS

ISA Japanese Patent Office, International Search Report Issued in Application No. PCT/JP2014/068782, dated Oct. 21, 2014, WIPO, 4 pages.
Korean Intellectual Property Office, Office Action Issued in Application No. 10-2019-7015740, dated Jul. 27, 2020, Korea, 6 Pages.
Japan Patent Office, Office Action Issued in Application No. 2018566702, dated Sep. 23, 2020, 8 pages.
China National Intellectual Property Administration, Office Action and Search Report Issued in Application No. 201780085693.0, dated Mar. 23, 2020, 7 pages.

\* cited by examiner

CONVENTIONAL ART

IMAGE PROCESSING METHOD AND IMAGE PROCESSING APPARATUS FOR EXECUTING IMAGE PROCESSING METHOD

TECHNICAL FIELD

The present invention relates to an image processing method and an image processing apparatus for executing the image processing method, and in particular relates to an image processing method in which an image displayed on a display panel in which pixels are aligned periodically is captured by a camera in which imaging pixels are aligned periodically, and thus moiré is removed from or suppressed in the captured image, and to an image processing apparatus for executing this image processing method.

BACKGROUND ART

In the case of capturing an image of a display panel such as a liquid crystal panel or an organic electroluminescent (EL) panel in which pixels are aligned periodically with a solid-state image sensor camera in which imaging pixels on an image capture plane are aligned periodically, moiré, which is also referred to as "interference fringe," appears in the captured image due to misalignment occurring between the period in which the pixels are aligned and the period in which the imaging pixels are aligned.

When the luminance of the pixels is measured based on the captured image in which moiré appears, the influence of the moiré needs to be suppressed due to the fact that the luminance cannot be accurately measured due to pixels at positions corresponding to the moiré on the display panel being measured as being dark.

As a countermeasure against this, the inventor of the present invention has proposed an image processing method for removing moiré by compositing an in-focus image and an out-of-focus image in Patent Document 1. With this image processing method, an in-focus image and an out-of-focus image of the display panel are captured, and image processing is performed by filtering each captured image using a high-pass filter and a low-pass filter of the image processing apparatus.

FIGS. 15(a)-(d) show diagrams showing processes of image processing performed using the image processing method, FIG. 15(a) being a diagram showing spatial frequency characteristics of the in-focus image and the out-of-focus image, FIG. 15(b) being a diagram showing filter characteristics of a high-pass filter and a low-pass filter, FIG. 15(c) being a diagram showing spatial frequency characteristics resulting from filtering the in-focus image and the out-of-focus image, and FIG. 15(d) being an image showing a spatial frequency characteristic of an image obtained by compositing images that have been filtered.

As shown in FIG. 15(a), a spatial frequency f1 of the in-focus image is output near a gain of 1 over a range in which the spatial frequency region ranges from 0 to the Nyquist frequency $f_N$. In the in-focus image, moiré M occurs in a region that is a low spatial frequency region of 1/10 or less of the Nyquist frequency. On the other hand, a spatial frequency f2 of the out-of-focus image gradually attenuates as it transitions in the range in which the spatial frequency region ranges from 0 to the Nyquist frequency $f_N$.

As shown in FIG. 15(b), the high-frequency component is extracted from the spatial frequency f1 of the in-focus image, and the low-frequency component is extracted from the spatial frequency f2 of the out-of-focus image, using a high-pass filter having a filter characteristic F1 and a low-pass filter having a filter characteristic F2 in the image processing apparatus used in the image processing method.

At this time, the moiré M that appeared in the low spatial frequency region is removed due to only the high-frequency component being extracted from the spatial frequency f1 of the in-focus image.

As shown in FIG. 15(c), the spatial frequency characteristic of the in-focus image resulting from filtering using the high-pass filter and the spatial frequency characteristic of the out-of-focus image resulting from filtering using the low-pass filter exhibit characteristics of relative characteristic compensation in which "transmittance of high-pass filter+ transmittance of low-pass filter=1" is satisfied for any spatial frequency.

When the in-focus image resulting from filtering and the out-of-focus image resulting from filtering are composited, the frequency characteristic of the composite image exhibits a spatial frequency characteristic f3, which is approximately flat over the range in which the spatial frequency region ranges 0 to the Nyquist frequency $f_N$, as shown in FIG. 15(d), and "composited frequency characteristic=in-focus spatial frequency characteristic" is satisfied for any spatial frequency. Accordingly, when the luminance of the display panel is measured, moiré is suitably removed, and an image with a favorable resolution can be composited.

CITATION LIST

Patent Document

Patent Document 1: WO 2016/009493A1

SUMMARY OF INVENTION

Technical Problem

Incidentally, in order to cause moiré to appear in a desired spatial frequency range, the separation distance between the display panel and the camera and the angle of capturing an image of the display panel with the camera need to be set precisely.

For example, in the case of capturing an image of the display panel with a camera having 6600×4400 imaging pixels, in order to cause moiré M to appear in a concentrated manner in the very low spatial frequency region shown in FIG. 15(a), the allowable error of the angle of capturing an image of the display panel with the camera needs to be set to about ±0.09° or less.

Although it is possible to set the angle of capturing an image of the displaying panel with the camera in this manner, the setting takes a comparatively long amount of time, and therefore it is difficult to actually implement at a site of manufacturing a display panel that requires efficient production in a very short amount of time in units of seconds, for example.

On the other hand, if the allowable error of the angle of capturing an image of the display panel with the camera is set to approximately ±1°, moiré M will appear away from the region that is 1/10 or less of the Nyquist frequency, as in FIG. 16(a).

In this case, when image processing is performed using the image processing method of Patent Document 1 in order to remove the moiré M, a recess will appear in the low spatial frequency region in the spatial frequency f3 of the composited image as shown in FIG. 16(b), due to attenuation rapidly occurring as the spatial frequency of the out-of-focus image transitions to the high spatial frequency region.

Accordingly, in this case, due to the fact that "composited frequency characteristic=frequency characteristic of in-focus image" is not satisfied for any spatial frequency, there is concern that an image with a favorable resolution cannot be composited.

The present invention was made in view of the foregoing circumstances, and aims to provide an image processing method according to which it is possible to suppress the influence of moiré without incurring a reduction of the resolution of an image, even if time is not taken to set an angle of capturing an image of a display panel with a camera, and an image processing apparatus for executing the image processing method.

Solution to Problem

A first image processing method for solving the above-described problem is an image processing method in which a display image of a display panel in which pixels are aligned periodically is captured with a camera in which imaging pixels are aligned periodically, and the captured image of the camera is processed, the image processing method including: an in-focus image capturing step of capturing the display image in-focus with the camera; a first image generation step of generating a first image by applying a high-pass filter to the captured image obtained in the in-focus image capturing step and removing or reducing a spatial frequency component corresponding to moiré that appears in the captured image; an out-of-focus image capturing step of capturing the display image out-of-focus with the camera; a captured image correction step of correcting attenuation of the spatial frequency component of the captured image obtained in the out-of-focus image capturing step using a correction filter by applying the correction filter to the captured image obtained in the out-of-focus image capturing step; a second image generation step of generating a second image by applying a low-pass filter to the captured image obtained in the out-of-focus image capturing step, the captured image having been corrected in the captured image correction step; and a third image generation step of generating a third image in which the moiré has been removed or suppressed, by compositing the first image and the second image, wherein a sum of a transmittance of the high-pass filter and a transmittance of the low-pass filter is a constant value at any spatial frequency.

According to this configuration, when the first image generated by applying the high-pass filter to the captured image captured in-focus and the second image generated by applying the low-pass filter to the captured image captured out-of-focus are to be composited to generate a third image, attenuation of the spatial frequency of the captured image captured out-of-focus is corrected using the correction filter.

Accordingly, when the third image is to be composited, the first image generated by removing or reducing the spatial frequency component corresponding to moiré with a high-pass filter and the second image generated by performing correction using a correction filter and then applying the low-pass filter are composited, whereupon the spatial frequency component that was removed or reduced using the high-pass filter is interpolated using the spatial frequency component that was corrected using the correction filter.

Accordingly, there is no need to precisely set the angle of capturing an image of the display panel with the camera for the purpose of causing the moiré to appear in a very low spatial frequency region in which moiré is easily removed, and therefore a third image with a favorable resolution, in which moiré has been appropriately removed or reduced, can be easily generated without taking time to set the camera.

A second image processing method is the first image processing method, in which the second image generation step includes a region division step of dividing the captured image obtained in the out-of-focus image capturing step into a plurality of regions, and spatial frequency components included in the regions divided through the region division step are corrected so as to match the spatial frequency component of the captured image obtained in the in-focus image capturing step by multiplying the spatial frequency components included in the regions by pre-obtained filter coefficients corresponding to the spatial frequency components.

According to this configuration, if the spatial frequency components included in the multiple divided regions are multiplied by the pre-obtained filter coefficients, the spatial frequency components included in the regions match the spatial frequency component of the captured image captured in-focus, and therefore attenuation of the spatial frequency of the captured image captured out-of-focus is corrected.

A third image processing method is the second image processing method, in which in the region division step, the captured image obtained in the out-of-focus image capturing step is divided with one region and another region overlapping each other, and a window function, which has a characteristic in which a sum of coefficients of any portion at which the divided regions overlap is a constant value, is applied to each of the regions.

According to this configuration, the captured image captured out-of-focus is divided into multiple regions with one region and another region overlapping with each other, and thereafter a window function having a characteristic in which the sum of the coefficients of any portion in which the divided regions overlap is a constant value is applied to each of the regions.

Accordingly, discontinuity between the regions that occurs when the captured image is divided into the multiple regions is suppressed.

A fourth image processing apparatus for solving the above-described problem is an image processing apparatus that includes a camera in which imaging pixels are aligned periodically and which is for capturing a display image of a display panel in which pixels are aligned periodically, the image processing apparatus being for processing a captured image captured by the camera, the image processing apparatus including: a high-pass filter for generating a first image by removing or reducing a spatial frequency component corresponding to moiré in a captured image obtained by capturing the display image in-focus with the camera; a correction filter for correcting attenuation of a spatial frequency of a captured image obtained by capturing the display image out-of-focus with the camera; a low-pass filter for generating a second image by extracting only a low spatial frequency component in the spatial frequency component of the captured image captured out-of-focus, which was corrected using the correction filter; and an image compositing unit for generating a third image in which the moiré has been removed or suppressed by compositing the first image and the second image, wherein a sum of a transmittance of the high-pass filter and a transmittance of the low-pass filter is a constant value at any spatial frequency.

According to this configuration, when a first image generated by applying a high-pass filter to a captured image captured in-focus and a second image generated by applying a low-pass filter to a captured image captured out-of-focus are composited to generate a third image, attenuation of the spatial frequency of the captured image captured out-of-focus is corrected using a correction filter.

Accordingly, when the third image is to be composited, the first image generated by removing or reducing the spatial frequency component corresponding to the moiré with the high-pass filter and the second image generated by performing correction using the correction filter and then applying the low-pass filter are composited, whereupon the spatial frequency component that was removed or reduced using the high-pass filter is interpolated using the spatial frequency component that was corrected using the correction filter.

Accordingly, there is no need to precisely set the angle of capturing an image of the display panel with the camera for the purpose of causing the moiré to appear in a very low spatial frequency region in which moiré is easily removed, and therefore a third image with a favorable resolution, in which moiré is appropriately removed or reduced, can be easily generated without taking time to set the camera.

A fifth image processing apparatus is the fourth image processing apparatus, in which the captured image captured out-of-focus is divided into a plurality of regions, and spatial frequency components included in the divided regions are corrected so as to match the spatial frequency component of the captured image captured in-focus, by multiplying the spatial frequency components included in the regions by pre-obtained filter coefficients corresponding to the spatial frequency components.

According to this configuration, if the spatial frequency components included in the multiple divided regions are multiplied by the pre-obtained filter coefficients, the spatial frequency components included in the regions match the spatial frequency component of the captured image captured in-focus, and therefore attenuation of the spatial frequency of the captured image captured out-of-focus is corrected.

A sixth image processing apparatus is the fifth image processing apparatus, in which the captured image captured out-of-focus is divided with one region and another region overlapping each other, and a window function, which has a characteristic in which a sum of coefficients of any portion at which the divided regions overlap is a constant value, is applied to each of the regions.

According to this configuration, the captured image captured out-of-focus is divided into multiple regions with one region and another region overlapping with each other, and thereafter a window function having a characteristic in which the sum of the coefficients of any portion in which the divided regions overlap is a constant value is applied to each of the regions.

Accordingly, discontinuity between the regions generated when the captured image is divided into the multiple regions is suppressed.

Advantageous Effects of Invention

According to the present invention, a third image with a favorable resolution, in which moiré is suitably removed or reduced, can easily be generated without taking time to set a camera.

DESCRIPTION OF EMBODIMENTS

Next, an embodiment of the present invention will be described with reference to FIGS. 1 to 14. Note that in the present embodiment, as an example, a case will be described in which a display panel is an image quality-adjusting organic EL panel.

Figure 1:
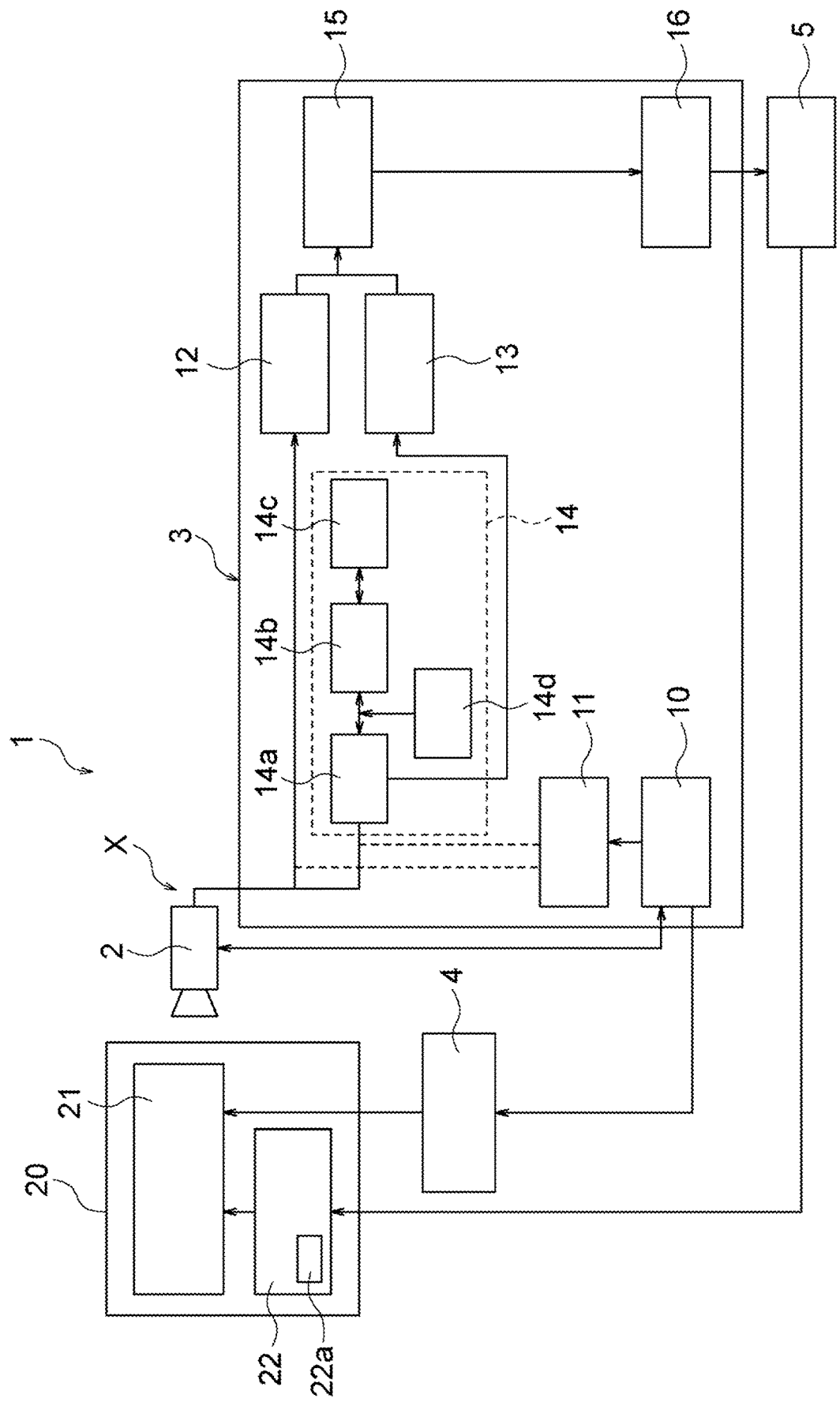
FIG. 1 is a block diagram for illustrating an overview of an image processing apparatus according to an embodiment of the present invention.
Figure 2:
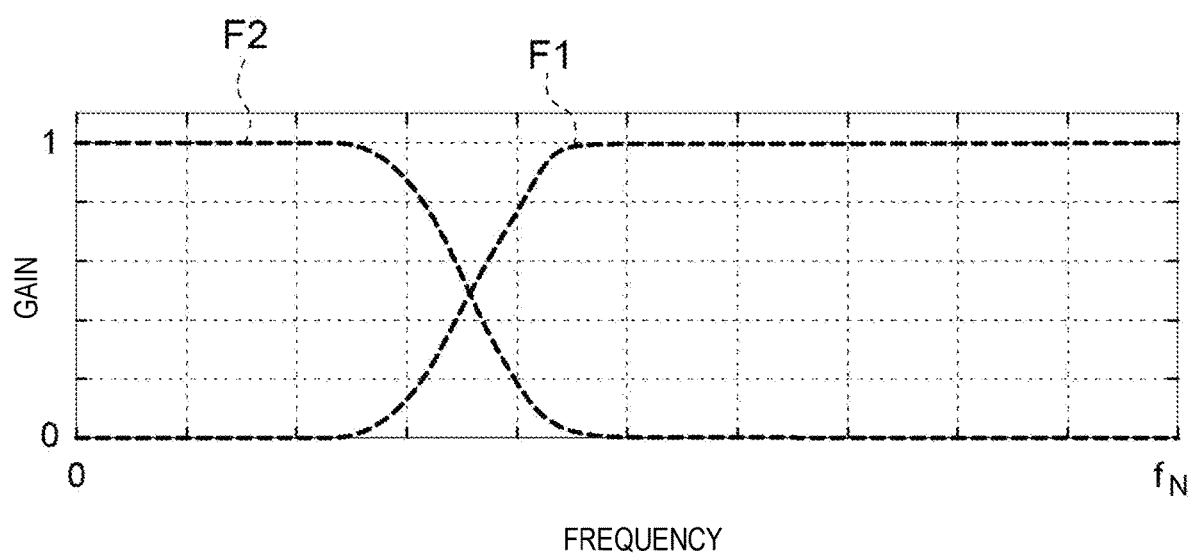
FIG. 2 is a conceptual diagram indicating filter characteristics of a high-pass filter and a low-pass filter according to the embodiment.

FIG. 1 is a block diagram for illustrating an overview of an image processing apparatus according to the present embodiment, and FIGS. 2 and 3 are conceptual drawings showing filter characteristics of a high-pass filter and a low-pass filter according to the present embodiment. An overview of an organic EL panel of the present embodiment will be described before the image processing apparatus is described.

An organic EL panel 20 includes a display 21 in which pixels having R (red), G (green), and B (blue) sub-pixels are arranged periodically. The display 21 is such that upon receiving input of an image signal, an image signal in accordance with later-described corrected data is output by an image quality adjustment circuit 22 built into a ROM 22a, whereby a decrease in display unevenness is achieved.

The image processing apparatus 1 is an apparatus that adjusts the image quality at a final stage of the manufacturing step of this kind of organic EL panel 20, and includes a camera 2, an image processing unit 3, a pattern generation unit 4, and a ROM writer 5.

In the present embodiment, the camera 2 is constituted by a camera in which a solid-state image sensor (CCD) is mounted, and the camera 2 captures a display image of the organic EL panel 20.

In the present embodiment, the camera 2 is arranged at an image capturing position X, at which the allowable error of the angle of capturing an image of the organic EL panel 20 using the camera 2 is not set precisely, as with an allowable error of about ±0.09° or less, for example, but the allowable error is set to, for example, ±1°, without taking time to perform setting.

The image processing unit 3 is an apparatus that processes an image captured by the camera 2, includes a control unit 10, a storage unit 11, a high-pass filter 12, a low-pass filter 13, a low spatial frequency processing unit 14, an image compositing unit 15, and a corrected data generation unit 16, and performs various types of processing on captured images obtained by capturing the display image of the organic EL panel 20.

The pattern generation unit 4 displays a predetermined pattern image (e.g., a later-described alignment pattern PA or luminance measurement pattern) on the organic EL panel 20, and the ROM writer 5 is a device that writes the later-described corrected data generated by the corrected data generation unit 15 in the ROM 22a built into the image quality adjustment circuit 22.

Next, a specific configuration of the units of the image processing unit 3 will be described.

The control unit 10 controls the units of the image processing unit 3 and controls image capture performed by the camera 2, image display on the organic EL panel 20 performed by the pattern generation unit 4, and writing in the ROM 22a performed by the ROM writer 5. Images captured by the camera 2 and the like are stored in the storage unit 11.

If moiré appears in the captured image captured in-focus by the camera 2, the high-pass filter 12 removes or reduces the component of the low spatial frequency region corresponding to the moiré, and the high-pass filter 12 has a filter characteristic F1 indicated by the broken line in FIG. 2. The high-pass filter 12 is applied to the captured image captured in-focus, and thus a first image is generated.

On the other hand, the low-pass filter 13 extracts the component of the low spatial frequency region of the captured image captured out-of-focus by the camera 2, and thus has a filter characteristic F2 indicated by the broken line in FIG. 2. A second image is generated by applying the low-pass filter 13 to the captured image captured out-of-focus.

In the present embodiment, as shown in FIG. 2, the high-pass filter 12 and the low-pass filter 13 employ relative characteristic compensation circuit configurations according to which "transmittance of high-pass filter+transmittance of low-pass filter=1" is satisfied for any spatial frequency over a range in which the spatial frequency region ranges from 0 to the Nyquist frequency $f_N$.

Figure 3A:
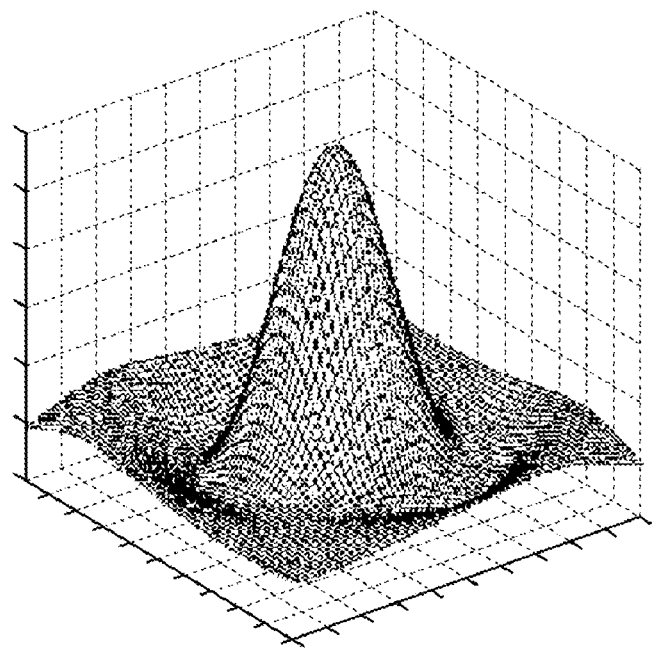
FIGS. 3(a)-(b) show conceptual diagrams showing two-dimensional spatial frequency characteristics of a captured image captured out-of-focus, according to the embodiment.
Figure 3B:
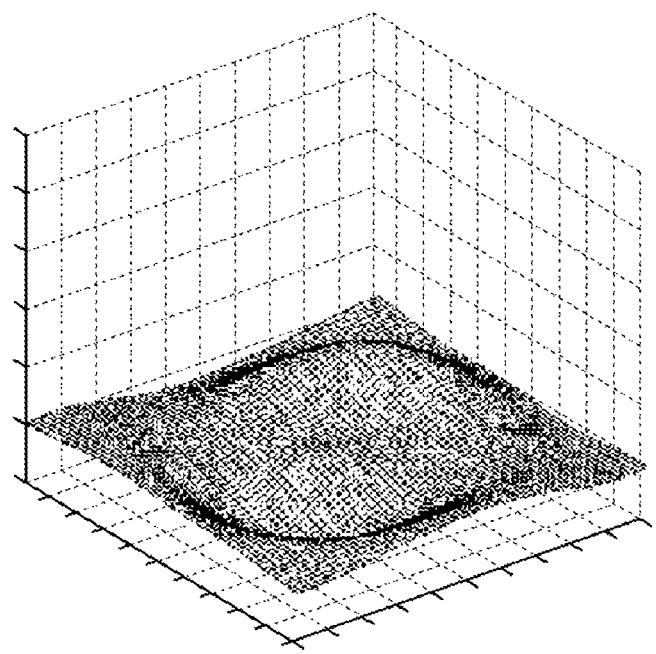

Note that the filter characteristics of the high-pass filter 12 and the low-pass filter 13 are as shown in FIG. 2, and due to the fact that the captured image is, in actuality, a two-dimensional image, the filter characteristics are also expressed in two dimensions, and the filter characteristics are two-dimensional functions as shown in FIGS. 3(a)-(b).

Before the low-pass filter 13 is applied to the captured image captured out-of-focus, the low spatial frequency processing unit 14 corrects the low spatial frequency component in advance, in the spatial frequency component of the captured image extracted using the low-pass filter 13.

In the present embodiment, the low spatial frequency processing unit 14 includes: an image division unit 14a; a Fourier transform unit 14b that is arranged in series with the image dividing unit 14a, a correction filter 14c that is arranged in series with the Fourier transform unit 14b, and a window function application unit 14d that is arranged between the image division unit 14a and the Fourier transform unit 14b.

The image division unit 14a performs separation and merging on the very low frequency component that is not to be corrected, in the spatial frequency component of the captured image captured out-of-focus by the camera 2.

Figure 4:
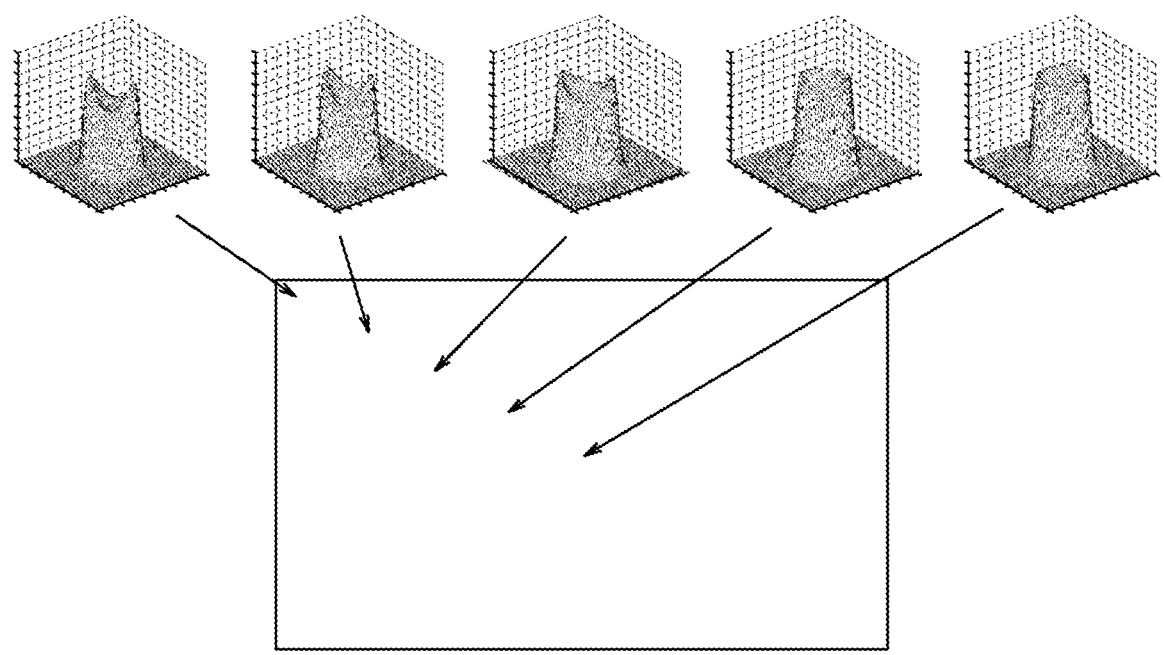
FIG. 4 is a conceptual diagram indicating filter characteristics of a spatial frequency component of a captured image according to the embodiment.
Figure 5:
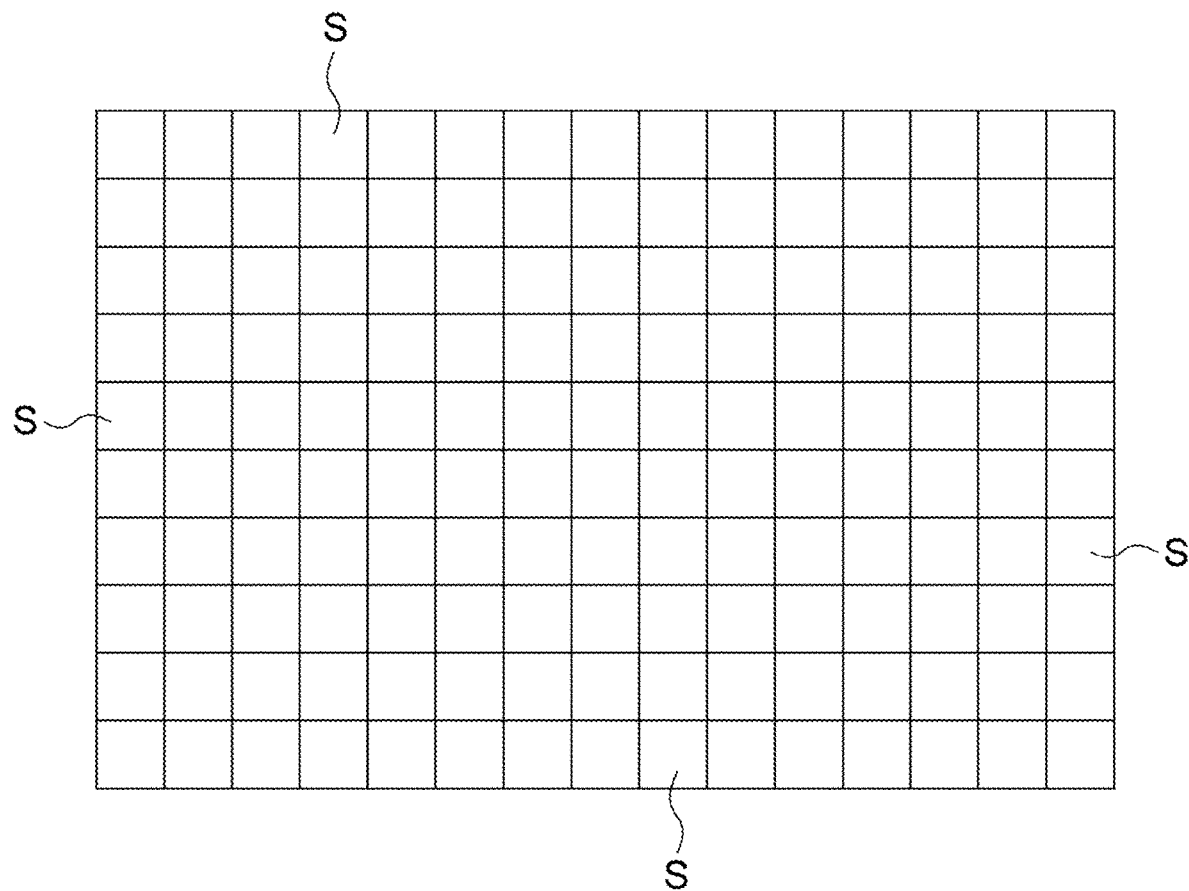
FIG. 5 is a conceptual diagram indicating a state in which a captured image according to the embodiment has been divided into multiple regions.

On the other hand, when the low spatial frequency component is to be corrected, the organic EL panel 20 has a different filter characteristic for the spatial frequency component of the captured image depending on the region as shown in FIG. 4, and therefore in order to perform correction by multiplying by a filter coefficient corresponding to the filter characteristic, the image division unit 14a divides the captured image captured out-of-focus into multiple regions s as shown in FIG. 5, for example, and performs merging on the divided regions s.

Here, if the captured image is divided as shown in FIG. 5, the multiple divided regions s will be discontinuous after the correction processing, and therefore in the present embodiment, when the captured image is to be divided into multiple regions including one region s and another region s, the captured image is divided with the adjacent regions s overlapping each other.

The Fourier transform unit 14b converts the captured image captured out-of-focus into spatial frequency components using a Fourier transform and converts the captured image that was converted into the spatial frequency components into a two-dimensional captured image using an inverse Fourier transform.

Figure 6:
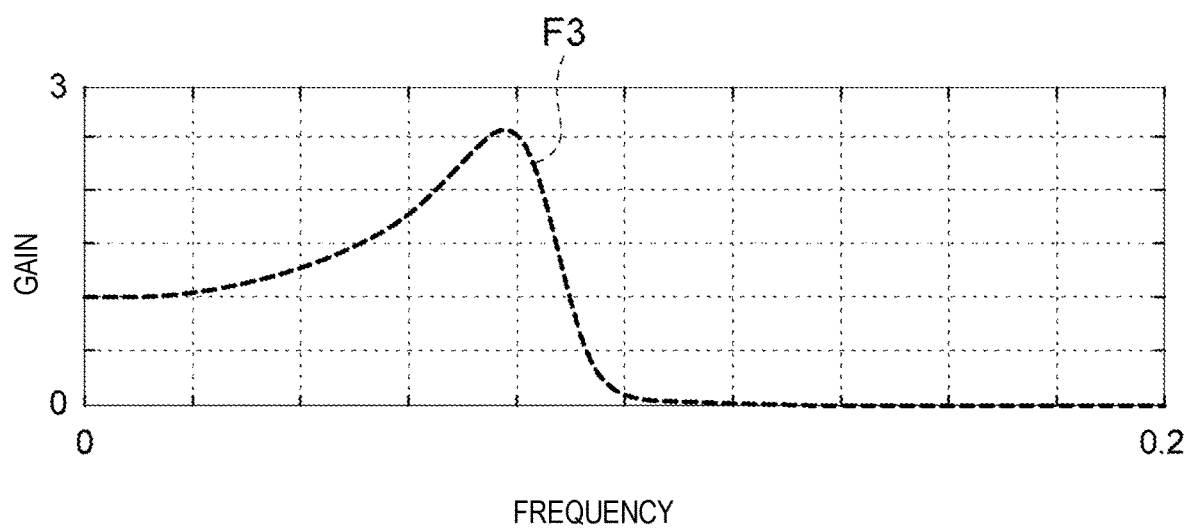
FIG. 6 is a conceptual diagram indicating a filter characteristic of a correction filter according to the embodiment.

The correction filter 14c performs correction by multiplying a low spatial frequency component extracted when the low-pass filter 13 is applied to the captured image captured out-of-focus by a pre-obtained filter coefficient, and has the filter characteristic F3 indicated by the broken line in FIG. 6. The correction processing performed by the correction filter 14c will be described with reference to FIGS. 7(a)-(b).

Figure 7A:
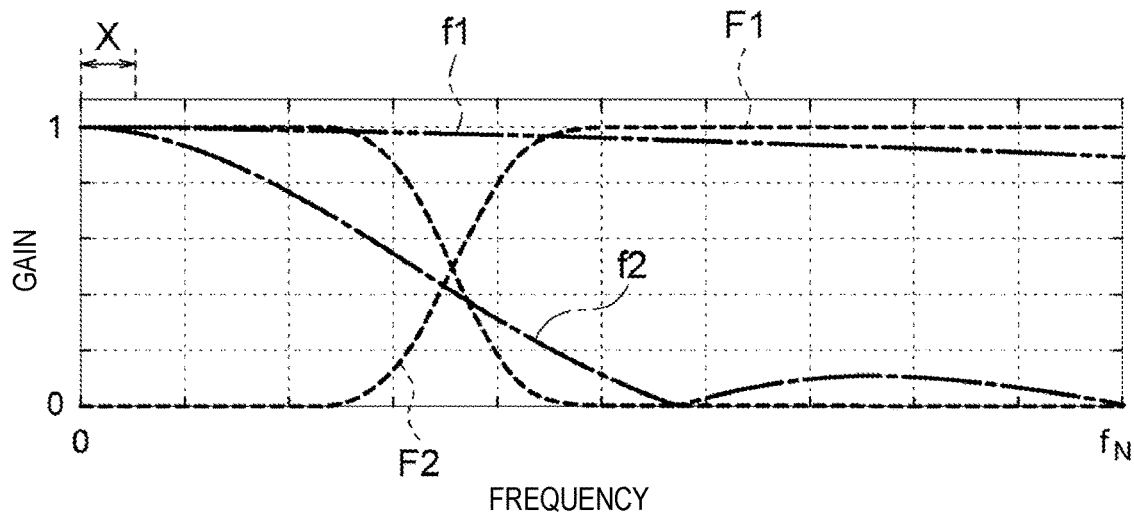
FIGS. 7(a)-(b) show images schematically showing image processing performed by an image processing apparatus according to the embodiment, FIG. 7(a) being an image in which a spatial frequency characteristic of a captured image captured in-focus and a spatial frequency characteristic of a captured image captured out-of-focus are overlaid on filter characteristics of the high-pass filter and the low-pass filter, and FIG. 7(b) being an image showing an overview of correction performed by the correction filter.
Figure 7B:
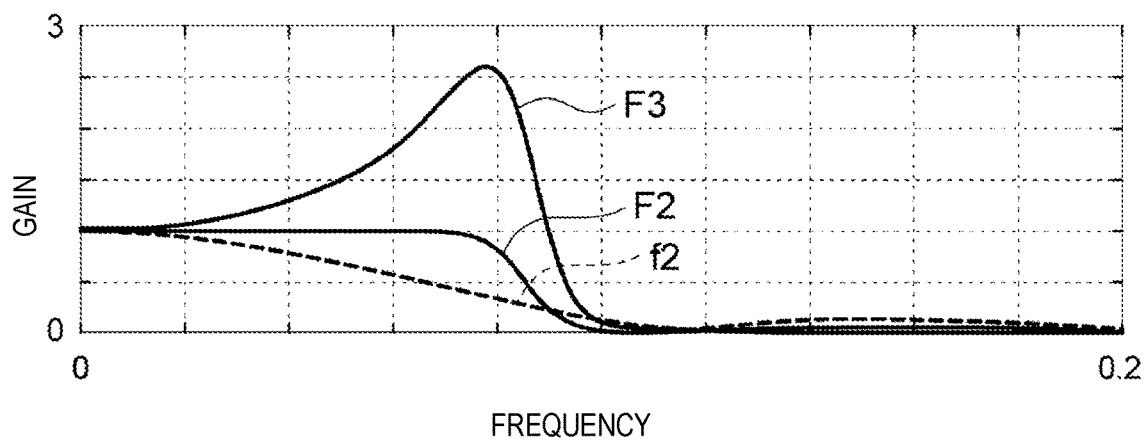

FIGS. 7(a)-(b) show images schematically showing image processing performed by the image processing apparatus 1 according to the present embodiment, FIG. 7(a) being an image in which a spatial frequency characteristic of a captured image captured in-focus and a spatial frequency characteristic of a captured image captured out-of-focus are overlaid on the filter characteristics of the high-pass filter 12 and the low-pass filter 13, and FIG. 7(b) being an image showing an overview of correction performed by the correction filter 14c.

As shown in FIG. 7(a), the spatial frequency component of the captured image captured in-focus is indicated by f1, and the spatial frequency component of the captured image captured out-of-focus is indicated by f2. The spatial frequency component f2 of the captured image captured out-of-focus attenuates as it transitions from a low spatial frequency component to a high spatial frequency component, and in the present embodiment, the spatial frequency component of this portion is corrected by the correction filter 14c.

As shown in FIG. 7(b), the spatial frequency component of the captured image captured out-of-focus is indicated by f2. Due to the fact that the correction filter 14c has a filter characteristic F3 that boosts the gain, the spatial frequency component f2 of the captured image captured out-of-focus is corrected so as to follow the spatial frequency characteristic F2 of the low-pass filter 13, which approximately matches the spatial frequency component f1 of the captured image captured in-focus.

In the present embodiment, this correction is executed by multiplying by filter coefficients obtained in advance in correspondence with the spatial frequency component f2 of the captured image captured out-of-focus.

Specifically, when the captured image captured out-of-focus is divided into multiple regions s, correction is executed by obtaining, in advance, pre-obtained filter coefficients corresponding to the spatial frequency components included the regions s, or in the present embodiment, filter coefficients that match the spatial frequency component of the captured image captured in-focus, and multiplying by the filter coefficients.

Figure 8:
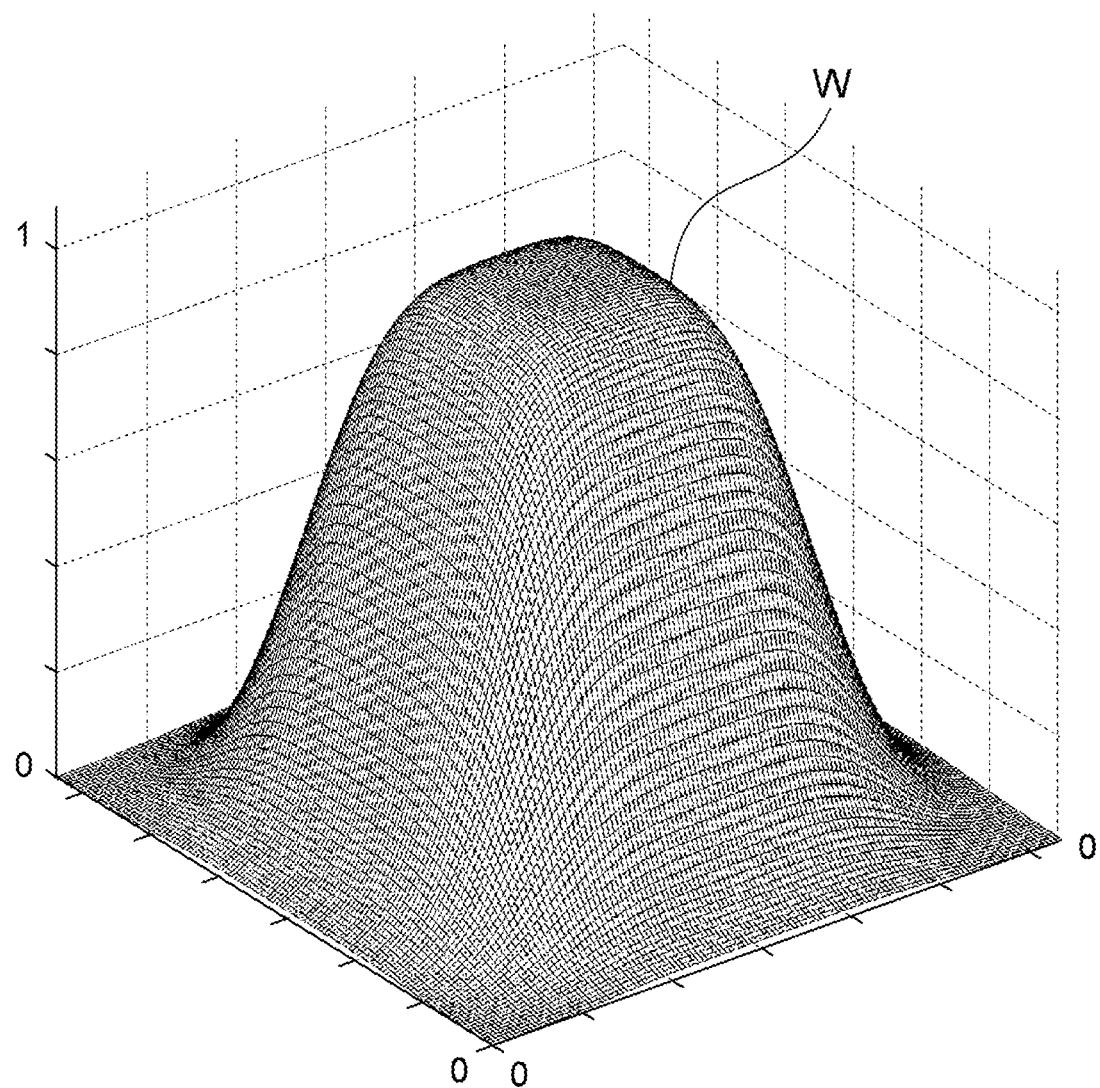
FIG. 8 is a diagram indicating coefficients of a window function according to the embodiment.

The window function application unit 14d applies the window function W shown in FIG. 8, which covers each of the regions s, is applied to the regions s of the captured image captured out-of-focus, which has been divided into the multiple regions s.

Figure 9:
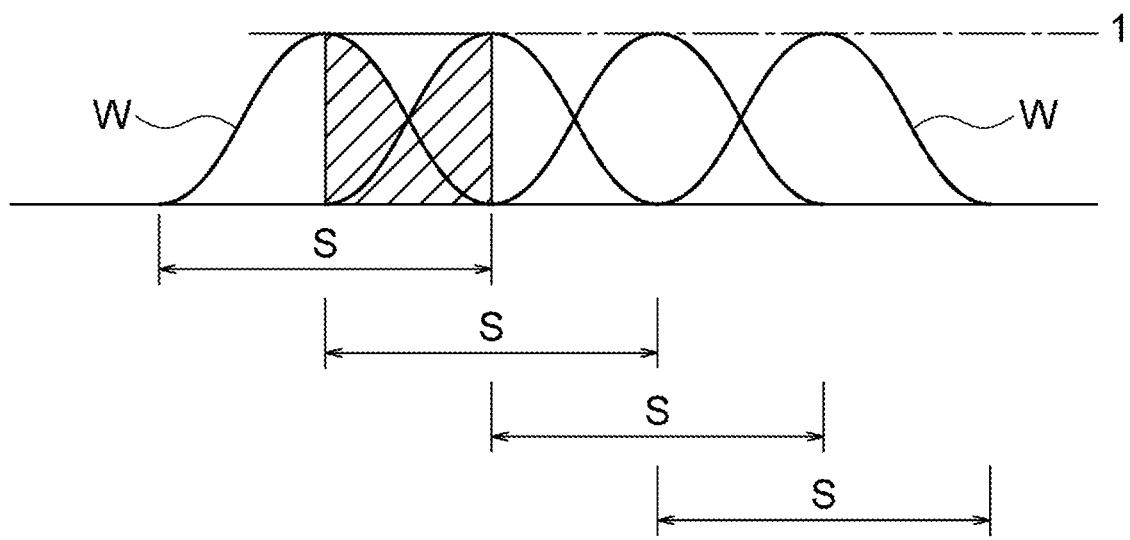
FIG. 9 is a conceptual diagram showing a state in which the window function according to the embodiment is applied to each region of the divided captured image.

As shown in FIG. 9, the window function W has a characteristic in which the sum of coefficients of any portion (e.g., the portion denoted by diagonal lines in FIG. 9) at which the divided regions s overlap is always a constant value, or in the present embodiment, 1.

That is, in the present embodiment, a window function having a shape in which a portion covering the approximate central portion of one region s is the peak of the gain, and the gain gradually decreases from the central portion of the one region s to an adjacent portion that is adjacent to another region s, is used as the window function W applied to the regions s.

In the present embodiment, from the viewpoint of efficiently removing discontinuity between the multiple regions s that occurs due to the captured image being divided into the multiple regions s and the regions s being multiplied by the filter coefficients by the correction filter 14c, the window function application unit 14d applies a window function W in which the sum of the coefficients of the spatial frequencies of the portions at which the regions s overlap is 1, before and after the correction performed by the correction filter 14c.

The image compositing unit 15 composites a new third image by adding together the first image generated by applying the high-pass filter 12 and the second image generated by applying the low-pass filter 13.

The corrected data generation unit 16 generates corrected data for reducing luminance unevenness of the organic EL panel 20 by adjusting the output of the image signal based on the third image composited by the image compositing unit 15.

Next, an image processing task performed by the image processing apparatus 1 according to the present embodiment will be described with reference to the flowchart shown in FIG. 10, which shows processes of the processing task performed by the image processing apparatus 1.

First, in the state in which the camera 2 is positioned at the image capture position X shown in FIG. 1, at step S1, the control unit 10 causes the organic EL panel 20 to display an alignment pattern PA, which is a first alignment pattern.

Figure 11:
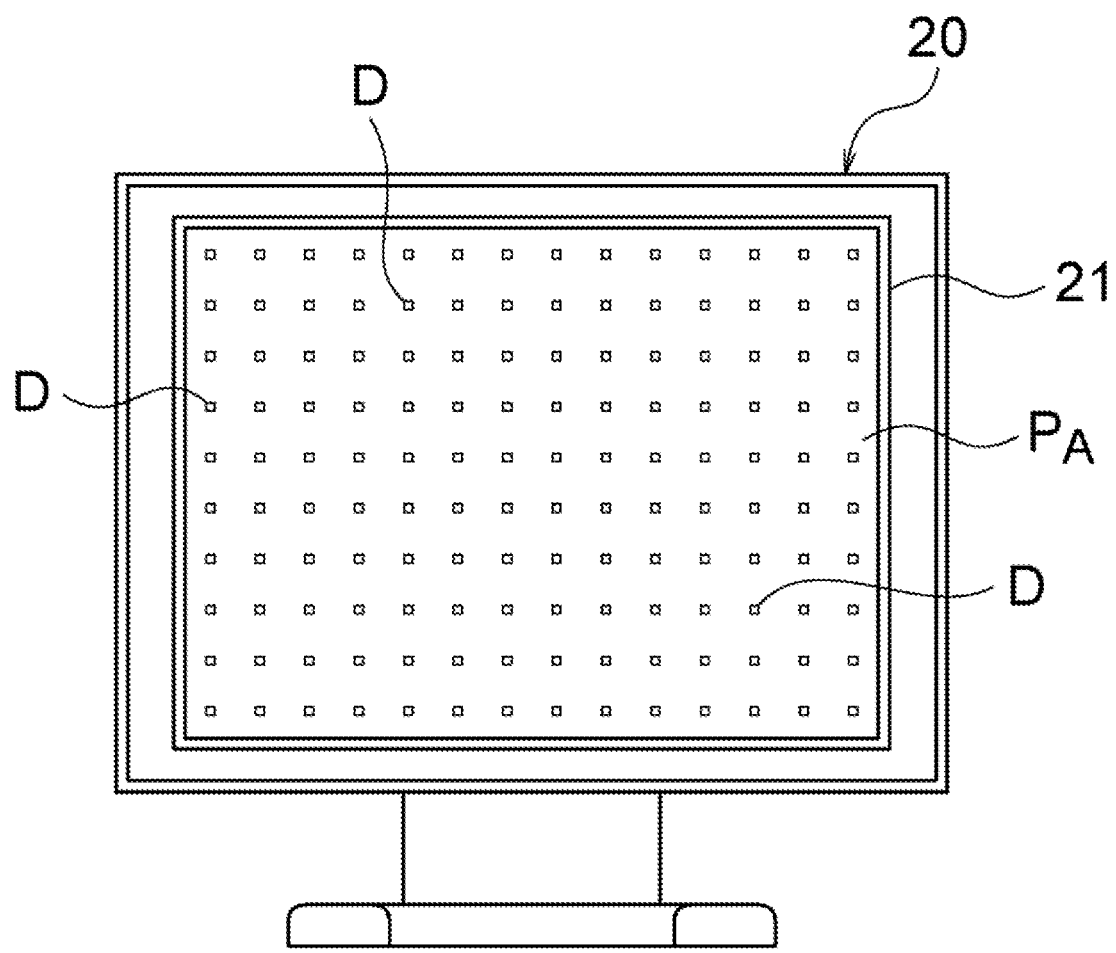
FIG. 11 is a diagram indicating a state in which an alignment pattern is displayed by the image processing apparatus of the embodiment.

As shown in FIG. 11, the alignment pattern PA is formed by specific pixels at known locations on the display 21 being illuminated and dots D being aligned vertically and horizontally.

At step S2, the control unit 10 captures the alignment pattern PA displayed on the organic EL panel 20 in-focus using the camera 2. After the alignment pattern PA is captured, at step S3, all of the pixels of the organic EL panel 20 are illuminated, and a luminance measurement pattern is displayed over the entire display 21.

At step S4, the luminance measurement pattern displayed on the organic EL panel 20 is captured in-focus by the camera 2 (in-focus image capture step).

On the other hand, at step S5, the imaging pixels of the camera 2 on which the dots D of the captured image of the alignment pattern PA are reflected are detected (first alignment step).

That is, because the pixels constituting the alignment pattern PA are known, the correspondence relationship between the pixels and the imaging pixels at the time of in-focus image capture is obtained by detecting which imaging pixels of the camera 2 receive the light of the images of the pixels.

Based on the obtained correspondence relationship, at step S6, alignment processing is performed on the image captured in-focus.

At step S7, the control unit 10 applies the high-pass filter 12 to the captured image resulting from the alignment processing, which was obtained in step S6.

Figure 12:
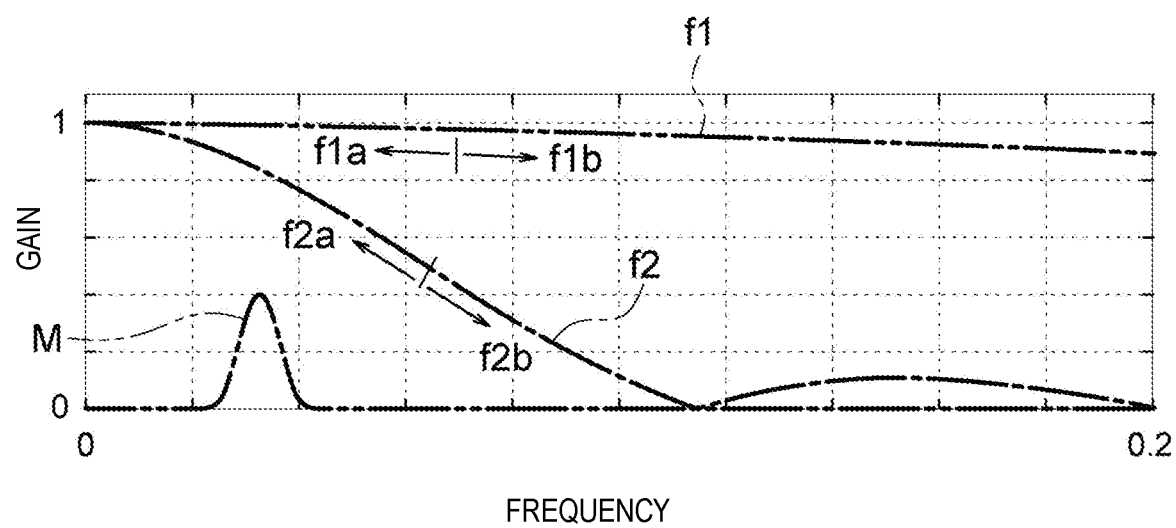
FIG. 12 is a diagram showing processes of image processing performed by the image processing apparatus of the embodiment.

By applying the high-pass filter 12, as shown in FIG. 12, the low spatial frequency component f1a including the portion corresponding to the moiré M in the spatial frequency component f1 of the captured image captured in-focus is cut, the leftover spatial frequency component f1b is extracted, and the first image is generated (first image generation step).

The generated first image is stored in the storage unit 11 at step S8.

After the first image is generated in this manner, at step S9, the alignment pattern PA, which is the second alignment pattern, is displayed on the organic EL panel 20.

Note that in the present embodiment, a case is described in which the first alignment pattern and the second alignment pattern are the same alignment pattern PA, but it is also possible for the first alignment pattern and the second alignment pattern to be different from each other.

At step S10, the alignment pattern PA displayed on the organic EL panel 20 is captured out-of-focus by the camera 2. After the alignment pattern PA is captured, at step S11, a luminance measurement pattern is displayed over the entire organic EL panel 20, similarly to step S3.

At step S12, the luminance measurement pattern displayed on the organic EL panel 20 is captured out-of-focus by the camera 2 (out-of-focus image capture step).

Next, at step S13, the imaging pixels of the camera 2 on which the dots D of the captured image of the alignment pattern PA are reflected are detected (second alignment step).

The correspondence relationship between the pixels and the imaging pixels at the time of out-of-focus image capture is obtained by detecting which pixels of the camera 2 receive the light of the images of the pixels constituting the alignment pattern PA, and based on the correspondence relationship, at step S14, alignment processing is performed on the image captured out-of-focus.

At step S15, the control unit 10 executes the image processing performed by the low spatial frequency processing unit 14 on the captured image resulting from the alignment, which was obtained in step S14 (captured image correction step). The content of the image processing performed by the low spatial frequency processing unit 14 will be described later.

At step S16, the control unit 10 applies the low-pass filter 13 to the spatial frequency of the captured image resulting from the image processing, which was obtained in step S15.

By applying the low-pass filter 13, as shown in FIG. 12, the spatial frequency component f2a corresponding to the spatial frequency component f1a that was removed by the high-pass filter 12 is extracted, the remaining spatial frequency component f2b is cut, and the second image is generated (second image generation step).

The generated second image is stored in the storage unit 11 at step S17.

Thus, after the first image and second image are generated, at step S18, the first image and the second image are merged together by the image compositing unit 15.

Accordingly, a third image is composited (third image generation step), and an image in which moiré is eliminated or suppressed is generated for the luminance measurement pattern. The luminance of the pixels constituting the organic EL panel 20 is obtained using the third image and the alignment data.

Note that if the luminance of each pixel is to be measured, the luminance of pixels in a portion projected on an imaging pixel may be measured as the luminance of one pixel by measuring the output of the imaging pixel in the portion on which the pixels were projected.

On the other hand, at step S19, corrected data is generated based on the third image, and at step S20, the generated corrected data is written in the ROM 22a of the image quality adjustment circuit 22 by the ROM writer 5.

Due to the corrected data being written in the ROM 22a, the image quality adjustment circuit 22 is implemented in the organic EL panel 20.

With the organic EL panel 20 in which the image quality adjustment circuit 22 is implemented, when an image signal is input, the corrected data written in the ROM 22a by the image quality adjustment circuit 22 is referenced, an image signal in accordance with the referenced corrected data is output, and reduction of display unevenness of the organic EL panel 20 is achieved.

With the image processing apparatus 1 having the above-described configuration, the high-pass filter 12 is applied to cut the spatial frequency component f1a including the portion corresponding to the moiré from the image captured in-focus, and the remaining spatial frequency component f1b is extracted to generate the first image.

On the other hand, the second image is generated by applying the low-pass filter 13 to the image captured out-of-focus and extracting only the spatial frequency component f2a corresponding to the spatial frequency component f1a that was removed by the high-pass filter 12.

The third image, in which moiré is eliminated or suppressed, is generated by the first image and the second image being added together by the image compositing unit 15 and the spatial frequency component f1a that was lost due to the moiré being cut from the first image being interpolated using the spatial frequency component f2a extracted from the second image.

Figure 13:
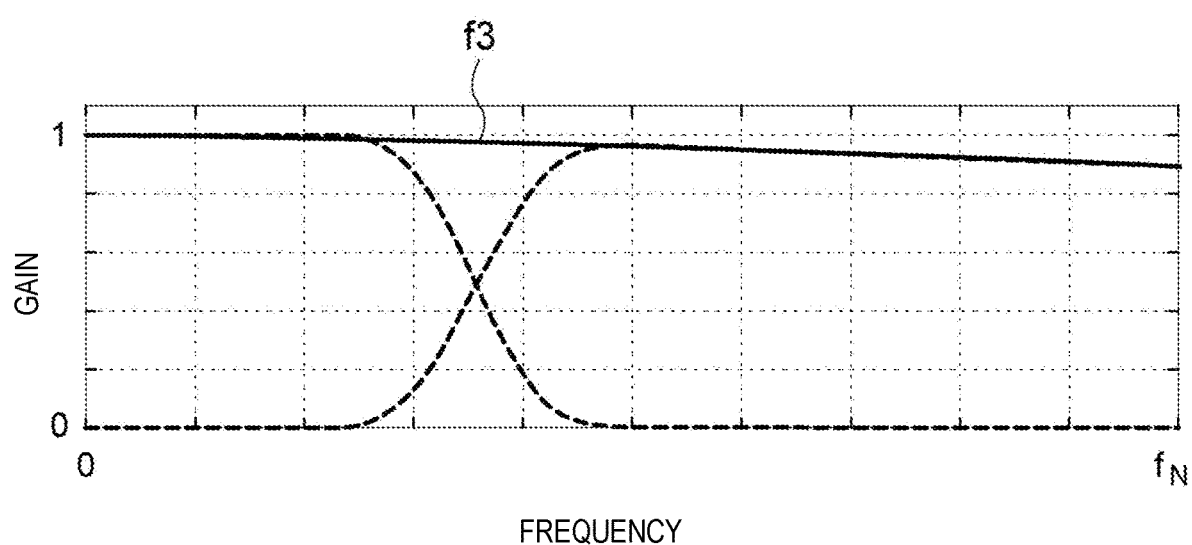
FIG. 13 is a diagram showing a spatial frequency component of a third image generated by the image processing apparatus of the embodiment.

Accordingly, it is possible to generate, a third image that has a favorable resolution and has a flat spatial frequency component f3 over approximately the entire region from the low spatial frequency region to the high frequency region as shown in FIG. 13, with the moiré suitably removed.

Moreover, in the present embodiment, a circuit configuration is formed such that the sum of the transmittances of the high-pass filter 12 and the low-pass filter 13 is 1, which is a constant value.

Accordingly, due to the fact that there is no failure to extract the spatial frequency component in the spatial frequency region, it is possible to generate a third image with a high resolution without losing the spatial frequency component.

Furthermore, when generating the first image and the second image that are to be used to composite the third image, in the present embodiment, the first image and the second image are generated with the alignment of the pixels of the organic EL panel 20 and the imaging pixels of the camera 2 determined. Accordingly, the correspondence relationship between the pixels and the imaging pixels can be suitably established, and a preferable third image can be generated.

In this way, when the luminance of the organic EL panel 20 is to be measured, it is possible to generate suitable corrected data based on the third image due to the fact that a third image with a suitable resolution, in which moiré is suitably removed, is generated.

As a result, the image quality of the organic EL panel 20 is adjusted using the corrected data generated based on an accurately-measured luminance, and a reduction of display unevenness is achieved. Accordingly, it is possible to obtain organic EL panels 20 in which individual product variation is suppressed.

Figure 14:
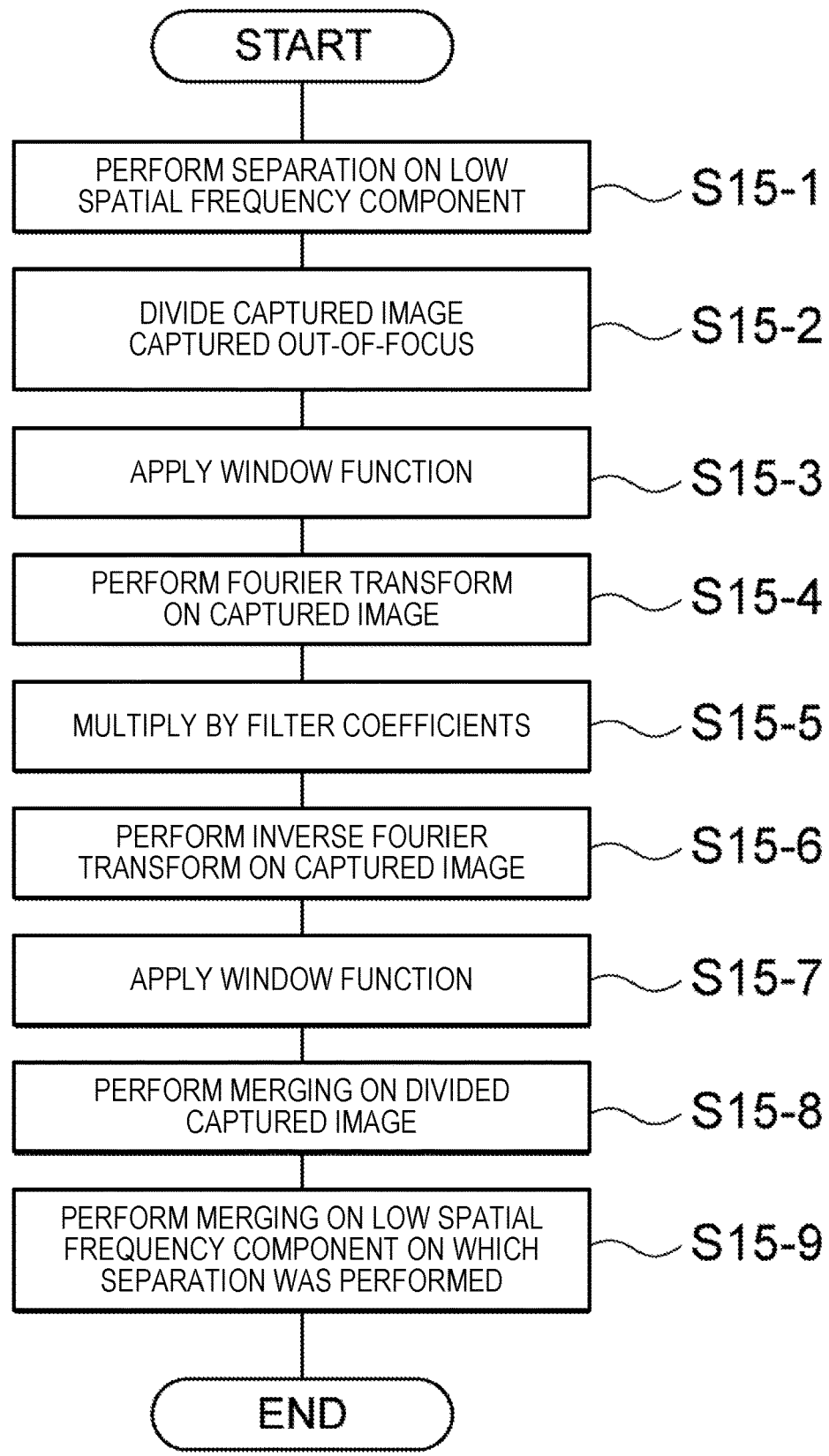
FIG. 14 is a flowchart showing processes of an image processing task performed by a low spatial frequency processing unit of the image processing apparatus of the embodiment.
Figure 15A:
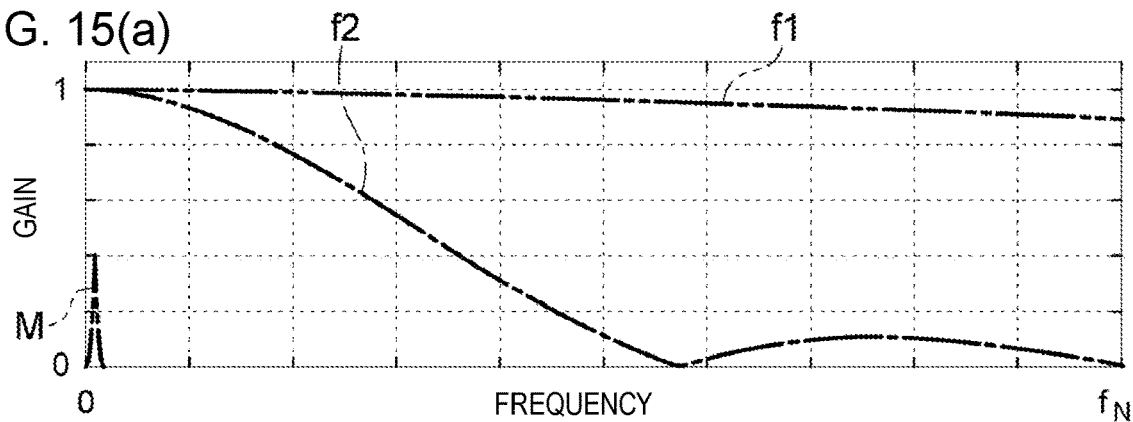
FIGS. 15(a)-(d) show diagrams showing processes of image processing performed using a conventional image processing method.
Figure 15B:
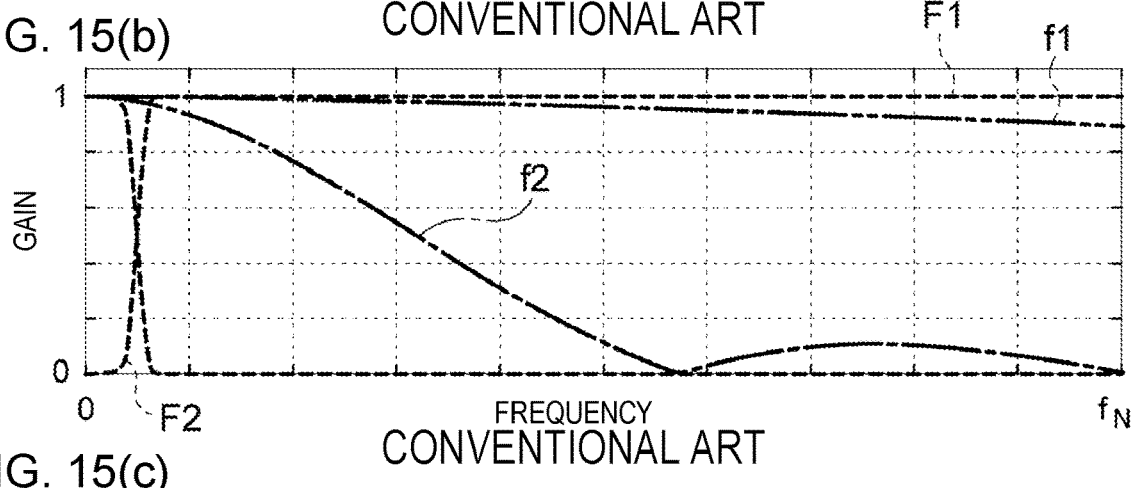
Figure 15C:
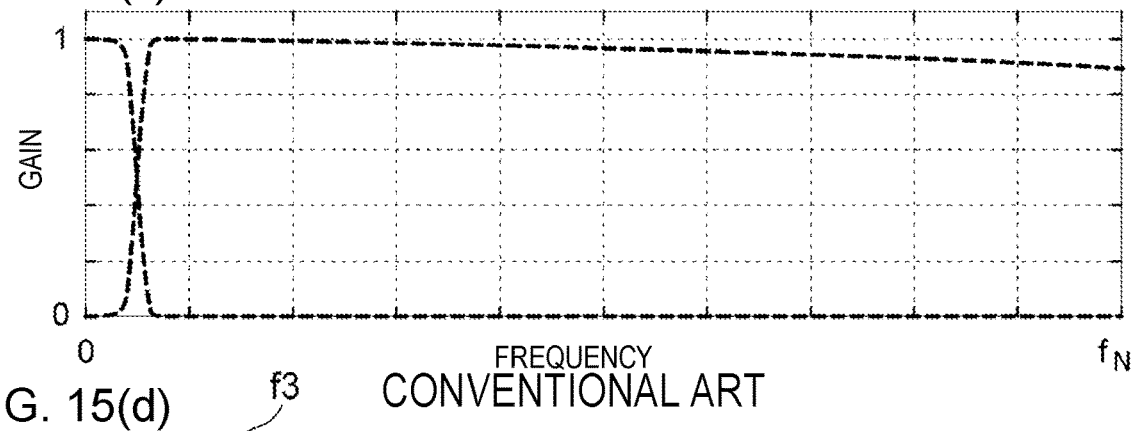
Figure 15D:
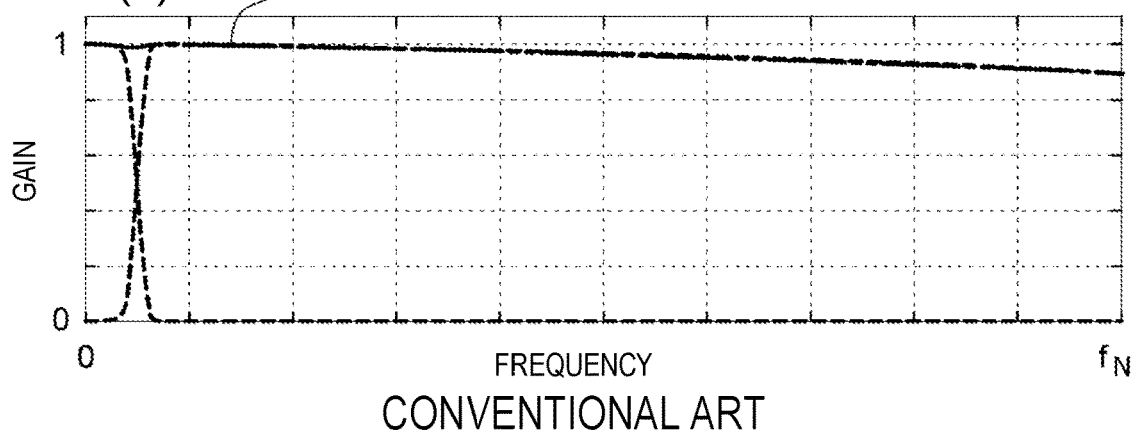
Figure 16A:
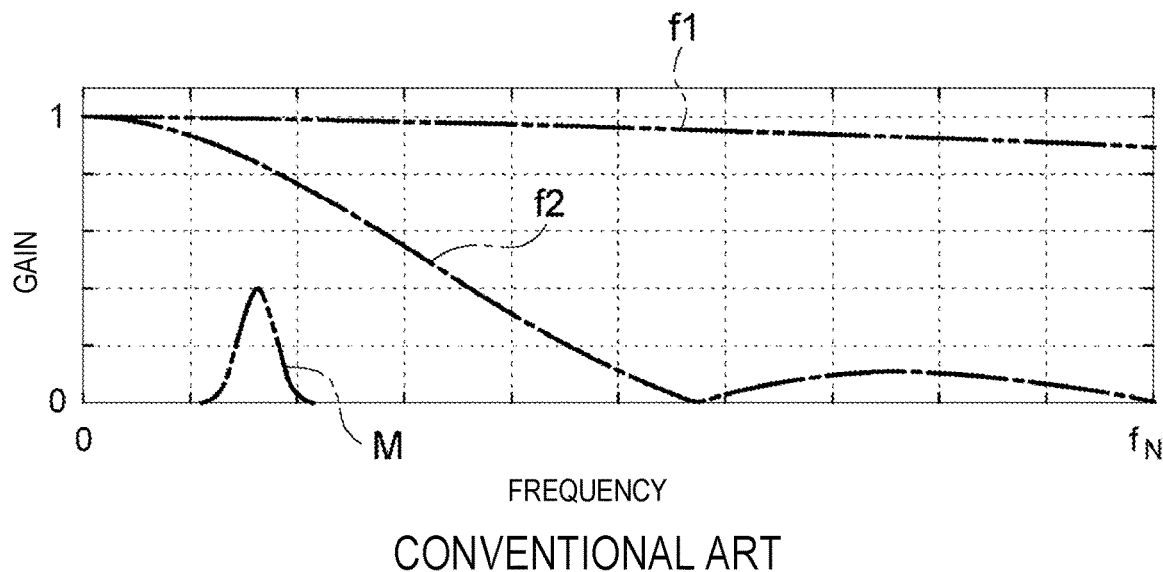
FIGS. 16(a)-(b) are diagrams showing processes of image processing performed using the conventional image processing method.
Figure 16B:
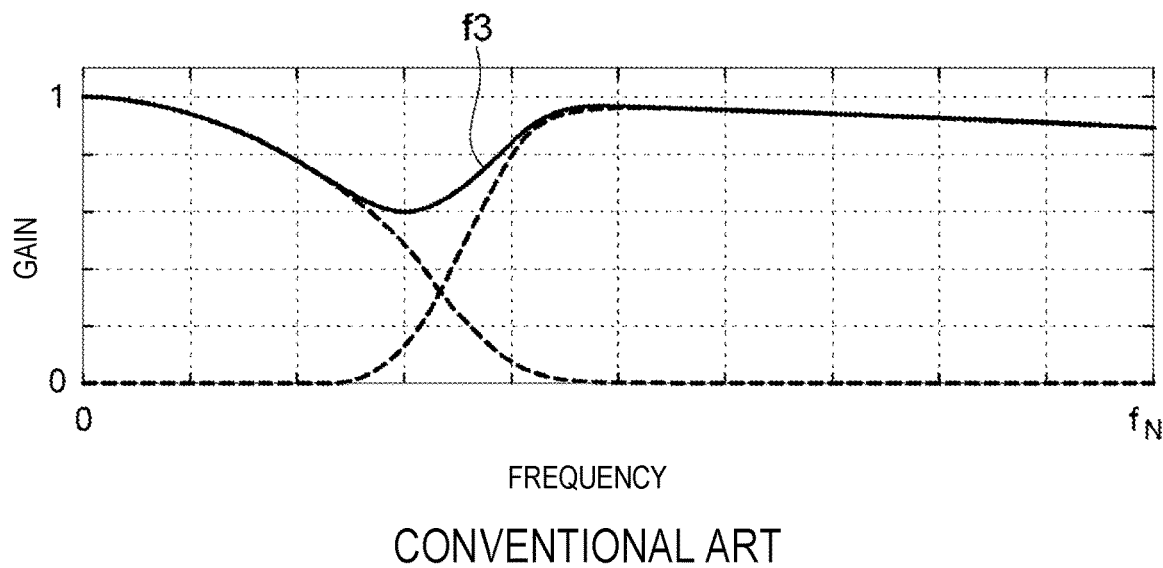

Next, an image processing task performed by the low spatial frequency processing unit 14 will be described with reference to the flowchart shown in FIG. 14, which shows processes of the processing task (captured image correction step) performed by the low spatial frequency processing unit 14.

First, in step S15-1, due to the fact that hardly any change such as attenuation or amplification occurs in the very low spatial frequency component of the region indicated by the arrow line X in FIG. 7(a), for example, in the spatial frequency component f2 of the captured image captured out-of-focus, in the present embodiment, the low spatial frequency component is subjected to separation by the image division unit 14a so as to avoid increasing the computation amount by performing correction of this portion using the correction filter 14c.

In step S15-2, the image division unit 14a divides the captured image captured out-of-focus into multiple regions s. When the captured image is to be divided into multiple regions s, division is performed with one region s that is to be divided and another region s adjacent thereto overlapping (region division step).

After the captured image is divided into the multiple regions s, in step S15-3, the window function application unit 14d applies a window function $\sqrt{W}$, which is the square root of the window function W covering each region s, to each of the divided regions s. The window function $\sqrt{W}$ is applied twice, once before and once after the correction processing performed by the correction filter 14c, and therefore has a shape that is the square root of the window function W, which has the same value as the window function W when squared.

Thereafter, in step S15-4, the Fourier transform unit 14b converts the captured image captured out-of-focus into the spatial frequency components by applying a Fourier transform thereto, and in step S15-5, the Fourier transform unit 14b multiplies the spatial frequency components included in the multiple divided regions s by pre-obtained filter coefficients that correspond thereto. Accordingly, the spatial frequency component f2 of the captured image captured out-of-focus is corrected so as to match the spatial frequency component f1 of the captured image captured in-focus.

In this manner, for each of the multiple divided regions s, correction is performed by multiplying by the pre-obtained filter coefficients corresponding to the regions s, and therefore the amount of time of the computation processing is shortened compared to the case of performing correction without dividing the captured image. Accordingly, an increase in the speed of image processing is realized.

After multiplying by the filter coefficients, in step S15-6, the Fourier transform unit 14b converts the captured image converted into the spatial frequency components into a two-dimensional captured image using an inverse Fourier transform.

In step S15-7, the window function W that covers each of the regions s is once again applied to the regions s obtained by dividing the captured image captured out-of-focus. In this manner, by applying the window function √W in step S15-3 and applying the window function in step S15-7, the sum of the coefficients of any portion at which the divided regions s overlap will always be a constant value.

At this time, in the present embodiment, the window function √W is applied after dividing the captured image into the multiple regions s and after multiplying by the filter coefficients, and therefore it is possible to efficiently remove discontinuity between the multiple regions s that occurs due to the captured image being divided into the multiple regions s and due to the multiple regions s being multiplied by the filter coefficients using the correction filter 14c.

In step S15-8, the image division unit 14a performs merging on the divided captured image, and in step S15-9, the image division unit 14a performs merging on the low spatial frequency component in the spatial frequency component f2 on which separation was performed in step S15-1.

Figure 10:
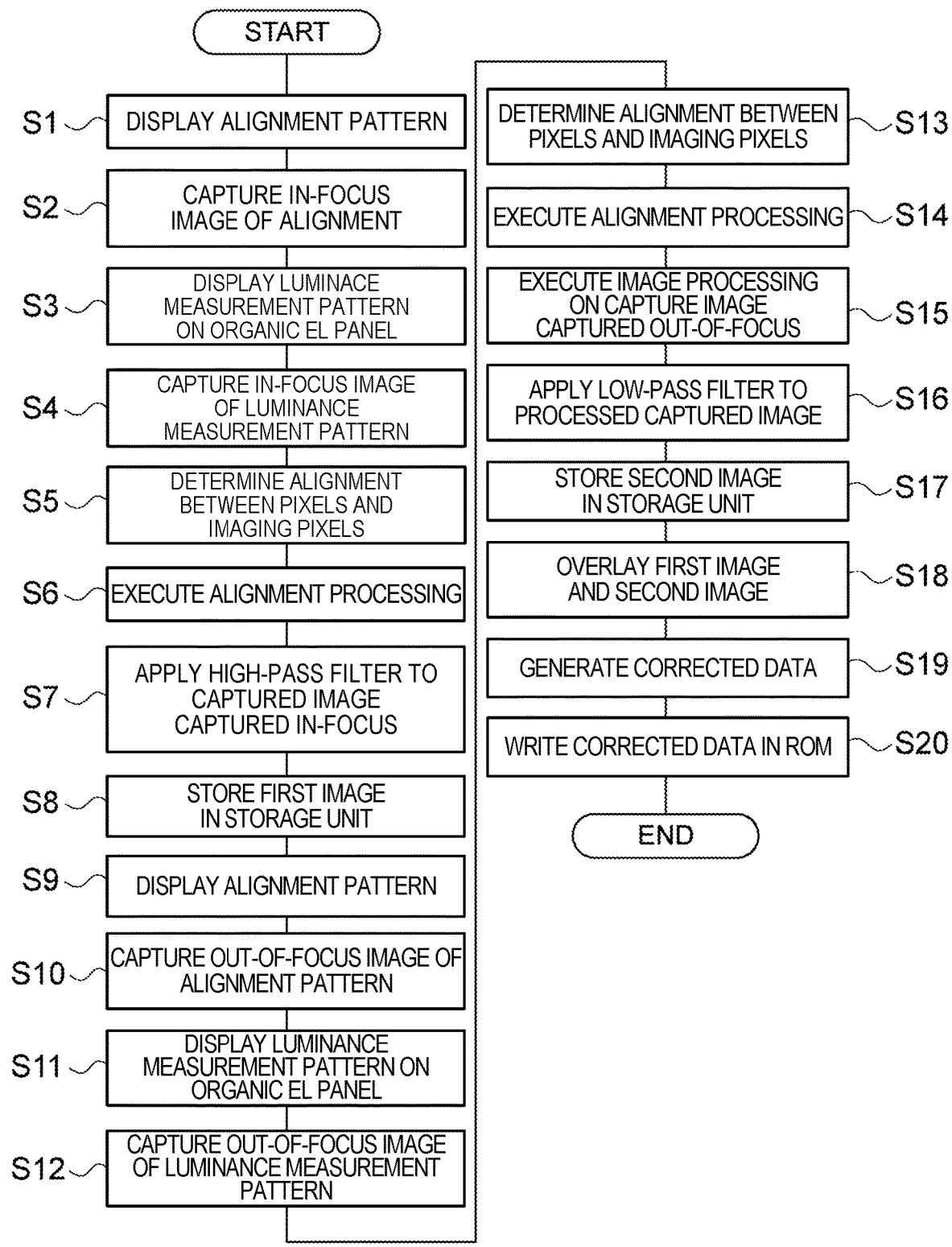
FIG. 10 is a flowchart showing processes of an image processing task performed by the image processing apparatus of the embodiment.

In step S16 shown in FIG. 10, the low spatial frequency processing unit 14 applies the low-pass filter 13 to the captured image that was subjected to image processing according to the above-described steps.

In this manner, when the third image is generated by compositing the first image generated by applying the high-pass filter 12 to the captured image captured in-focus and the second image generated by applying the low-pass filter 13 to the captured image captured out-of-focus, rapid attenuation of the spatial frequency f2 of the captured image captured out-of-focus that occurs as a transition is made from the low spatial frequency region to the high spatial frequency region is corrected by the correction filter 14c.

Accordingly, when the third image is composited, if the first image, which has a high spatial frequency component f1b extracted by using the high-pass filter 12 to remove the low spatial frequency component 41a including the portion corresponding to the moiré M, and the second image, which was generated after correcting the low spatial frequency component f2a using the correction filter 14c, are composited, the low spatial frequency component f1a removed by the high-pass filter 12 is supplemented by the low spatial frequency component f2a corrected by the correction filter 14c.

As a result, there is no need to precisely set the angle of capturing an image of the organic EL panel 20 with the camera 2 for the purpose of causing moiré to appear in the very low spatial frequency region, in which moiré is easily removed, and therefore a third image with a favorable resolution, which has the spatial frequency component f3 that is flat over approximately the entire region from the low spatial frequency region to the high spatial frequency region, can be generated without taking time to set the angle for capturing an image of the organic EL panel 20 with the camera 2.

If the captured image captured out-of-focus is to be corrected with the correction filter 14c, correction is performed by dividing the captured image into multiple regions s and multiplying by filter coefficients obtained in advance in correspondence with the spatial frequency components included in the divided regions s.

When the spatial frequency components included in the regions s are multiplied by the filter coefficients obtained in advance, in the present embodiment, the spatial frequency components included in the regions s match the spatial frequency components f1a of the regions of the captured image captured in-focus that are attenuated by the high-pass filter, and therefore the attenuation of the spatial frequency of the captured image captured out-of-focus is corrected.

Furthermore, from the viewpoint of suppressing discontinuity between the regions s that occurs due to the captured image captured out-of-focus being divided into the multiple regions s, the image division unit 14a performs division with the regions s overlapping each other when the captured image is to be divided into the multiple regions s.

Moreover, in the present embodiment, the window function application unit 14d applies a window function W in which the sum of the coefficients of the portions of the divided regions s that overlap is 1 to the regions s, and therefore the discontinuity between the multiple regions s is efficiently removed.

Note that the present invention is not limited to the above-described embodiments and can be modified in various ways without departing from the scope of the invention. In the above-described embodiments, a case was described in which in-focus image capture and out-of-focus image capture were performed by a single camera 2, but in-focus image capture and out-of-focus image capture may be performed by respective separate cameras.

Accordingly, the process work time (tact time) of the processing work performed by the image processing apparatus 1 is shortened.

In the above-described embodiment, a case was described in which the image processing apparatus 1 adjusts the image quality of the organic EL panel 20, but it is also possible to use a liquid crystal panel, a plasma display, a projection-type projector, or the like, for example.

LIST OF REFERENCE CHARACTERS

1 Image processing apparatus
2 Camera
3 Image processing unit
10 Control unit
12 High-pass filter
13 Low-pass filter
14 Low spatial frequency processing unit
14c Correction filter 20 Organic EL panel (display panel)
F1 Filter characteristic of high-pass filter
F2 Filter characteristic of low-pass filter
F3 Filter characteristic of correction filter
M Moiré
s Region
W Window function

The invention claimed is:

1. An image processing method in which a display image of a display panel in which pixels are aligned periodically is captured with a camera in which imaging pixels are aligned periodically, and the captured image of the camera is processed, the image processing method comprising:
an in-focus image capturing step of capturing the display image in-focus with the camera to obtain a first captured image;
a first image generation step of generating a first image by applying a high-pass filter to the first captured image and removing or reducing a spatial frequency component corresponding to moiré that appears in the first captured image;
an out-of-focus image capturing step of capturing the display image out-of-focus with the camera to obtain a second captured image;
a captured image correction step of correcting attenuation of the spatial frequency component of the second captured image using a correction filter by applying the correction filter to the second captured image;
a second image generation step of generating a second image by applying a low-pass filter to the second captured image, the second captured image having been corrected in the captured image correction step; and
a third image generation step of generating a third image in which the moiré has been removed or suppressed, by compositing the first image and the second image,
wherein a sum of a transmittance of the high-pass filter and a transmittance of the low-pass filter is a constant value at any spatial frequency.

2. The image processing method according to claim 1,
wherein the second image generation step includes a region division step of dividing the second captured image into a plurality of regions, and
spatial frequency components included in the regions divided through the region division step are corrected so as to match the spatial frequency component of the first captured image by multiplying the spatial frequency components included in the regions by pre-obtained filter coefficients corresponding to the spatial frequency components.

3. The image processing method according to claim 2,
wherein in the region division step, the second captured image is divided with one region and another region overlapping each other, and
a window function, which has a characteristic in which a sum of coefficients of any portion at which the divided regions overlap is a constant value, is applied to each of the regions.

4. An image processing apparatus that includes a camera in which imaging pixels are aligned periodically and which is for capturing a display image of a display panel in which pixels are aligned periodically, the image processing apparatus being for processing a captured image captured by the camera, the image processing apparatus comprising:
a high-pass filter for generating a first image by removing or reducing a spatial frequency component corresponding to moiré in a first captured image obtained by capturing the display image in-focus with the camera;
a correction filter for correcting attenuation of a spatial frequency of a second captured image obtained by capturing the display image out-of-focus with the camera;
a low-pass filter for generating a second image by extracting only a low spatial frequency component in the spatial frequency component of the second captured image, which was corrected using the correction filter; and
an image compositing unit for generating a third image in which the moiré has been removed or suppressed by compositing the first image and the second image,
wherein a sum of a transmittance of the high-pass filter and a transmittance of the low-pass filter is a constant value at any spatial frequency.

5. The image processing apparatus according to claim 4,
wherein the second captured image is divided into a plurality of regions, and
spatial frequency components included in the divided regions are corrected so as to match the spatial frequency component of the first captured image, by multiplying the spatial frequency components included in the regions by pre-obtained filter coefficients corresponding to the spatial frequency components.

6. The image processing apparatus according to claim 5,
wherein the second captured image is divided with one region and another region overlapping each other, and
a window function, which has a characteristic in which a sum of coefficients of any portion at which the divided regions overlap is a constant value, is applied to each of the regions.

* * * * *